United States Patent [19]

McGuirk, Jr.

[11] 3,866,168
[45] Feb. 11, 1975

[54] DOOR LOCK, POWER AND ALARM CONTROL CIRCUIT FOR AUTOMOTIVE VEHICLES AND THE LIKE

[75] Inventor: Francis A. McGuirk, Jr., Chatham, N.J.

[73] Assignee: Wager Electric Corporation, Parsippany, N.J.

[22] Filed: Jan. 15, 1973

[21] Appl. No.: 323,827

[52] U.S. Cl. ............... 340/64, 180/114, 307/10 AT, 340/63
[51] Int. Cl. ......................... B60r 25/04, B60r 25/10
[58] Field of Search .................. 340/63, 64, 276; 307/10 AT; 317/134; 180/114

[56] References Cited
UNITED STATES PATENTS
3,428,033  2/1969  Watts ............................ 307/10 AT
3,723,967  3/1973  Atkins et al. ...................... 340/64

Primary Examiner—Donald J. Yusko
Assistant Examiner—Joseph E. Nowicki
Attorney, Agent, or Firm—Eyre, Mann & Lucas

[57] ABSTRACT

Circuitry operative in response to the generation and termination of a control signal to disable an alarm so that a vehicle engine may be started without actuating the alarm within a predetermined period of time after the termination of the control signal. This control signal also causes unlocking of one or more vehicle doors. If entry to the vehicle is achieved without generating the control signal, any subsequent attempt to start the engine will actuate the alarm, which may be the vehicle horn. In addition, the circuitry is operative to cause locking of all vehicle doors when any door is opened and reclosed, and unlocking of all vehicle doors when the ignition switch is turned off. After engine turn-off, restarting may be accomplished by actuation of the starter switch within the aforementioned predetermined period of time without again generating the control signal.

15 Claims, 1 Drawing Figure

PATENTED FEB 11 1975 3,866,168
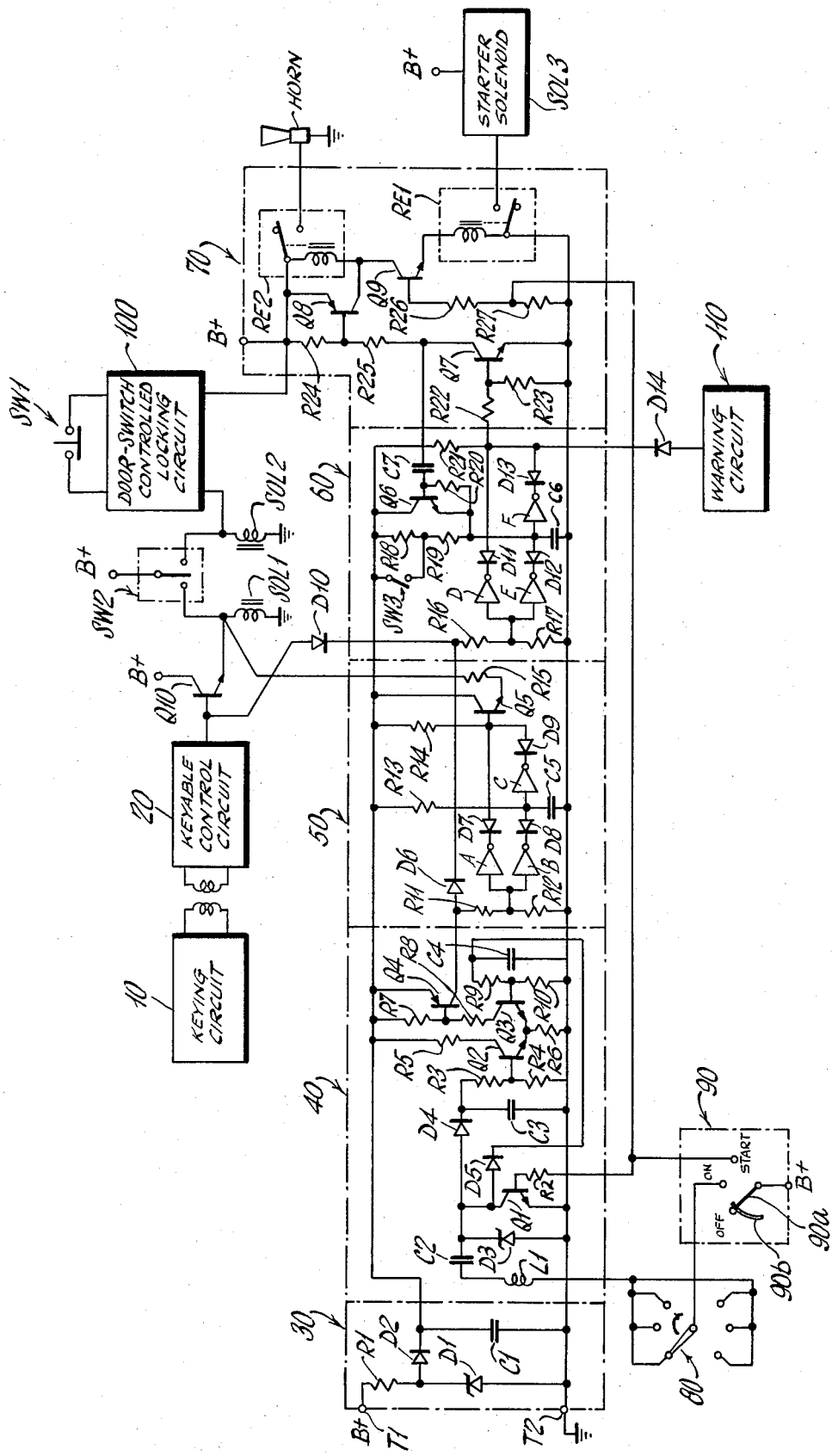

DOOR LOCK, POWER AND ALARM CONTROL CIRCUIT FOR AUTOMOTIVE VEHICLES AND THE LIKE

CROSS-REFERENCES TO RELATED APPLICATIONS

The present invention represents a significant advance over the invention disclosed and claimed in U.S. Pat. No. 3,824,403 issued on July 16, 1974 upon copending application Ser. No. 289,283 entitled POWER CONTROL CIRCUIT FOR AUTOMOTIVE VEHICLES AND THE LIKE filed on Sept. 15, 1972 in the name of Francis A. McGuirk, Jr. The door lock and power control system disclosed herein may advantageously incorporate the combination of the keying circuit and keyable control circuit disclosed and claimed in either U.S. Pat. No. 3,723,967 issued on Mar. 27, 1973 upon copending application Ser. No. 127,463 entitled INDUCTION-KEYED DOOR LOCK AND POWER CONTROL CIRCUIT FOR AUTOMATIC VEHICLES AND THE LIKE filed on Mar. 24, 1971 in the names of Carl E. Atkins and Paul A. Carlson, or U.S. Pat. No. 3,842,324 issued on Oct. 15, 1974 upon copending application Ser. No. 301,438 entitled INDUCTION-KEYED CONTROL CIRCUIT WITH KEYING NETWORK HAVING VARIABLE RESONANT FREQUENCY filed on Oct. 27, 1972 in the name of Carl E. Atkins. Also, the system disclosed herein may advantageously incorporate a warning circuit of the type disclosed and claimed in U.S. Pat. No. 3,803,515 issued on Apr. 9, 1974 upon copending application Ser. No. 255,155 entitled ELECTRONIC TIMING CIRCUITS filed on May 19, 1972 in the name of Paul A. Carlson.

BACKGROUND OF THE INVENTION

The problem of deterring or preventing theft of automotive vehicles is a continuing and increasing social menace. A wide variety of approaches, systems and devices have been formulated and devised in an attempt to solve this problem. As automotive technology advances, the automobiles produced in succeeding model years incorporate increasingly sophisticated, adaptive and complex means for deterring or preventing automotive theft. However, relatively few systems have been devised which may be either incorporated into new automobiles during their manufacture, or retrofitted to the large number of older automobiles in use on the American road.

The present invention relates to door lock, power and alarm control circuitry which may advantageously be employed, for example, in a system for controlling access to and operation of an automotive vehicle. This control circuitry may readily be incorporated into an automobile during its manufacture, or may be retrofitted to an existing, older automobile with equal facility. The circuit which embodies the present invention is designed to be cooperatively interconnected to existing elements of an automotive vehicle, including the distributor, ignition switch, starter solenoid, one or more door unlocking solenoids, means for actuating those solenoids, and the horn. Various input signals are derived from the distributor, ignition switch and solenoid actuating means to cause generation of an alarm disabling signal, an engine start-up signal, and a door unlocking signal. In order to minimize drain on the vehicle battery, complementary symmetry/metal oxide semiconductor (COS/MOS) devices are extensively employed in the circuit forming the present invention in order to hold standby power dissipation to a low level.

SUMMARY OF THE INVENTION

The present invention is embodied in and carried out by a circuit operative to receive a control signal and, in response thereto, to disable an alarm so as to enable the starting of an engine within a predetermined period of time without actuating the alarm. If the engine is started without prior generation of the control signal, the alarm will be actuated. After start-up, if the engine is shut off by the operator, or if the engine stalls, a surrogate signal is automatically generated to take the place of said control signal. Thus, the engine may be restarted within said predetermined period of time without again having to provide said control signal. The surrogate signal also causes generation of an unlocking pulse which causes one or more locks to open.

BRIEF DESCRIPTION OF THE DRAWING

The present invention may be better understood by reading the written description thereof with reference to the accompanying drawing, which is a partially schematic, partially block diagram of a system incorporating the present invention.

DESCRIPTION OF THE PREFERRED EMBODIMENT

Referring now to the drawing, the system shown there preferably incorporates the combination of a keying circuit 10 and an associated keyable control circuit 20 of the types disclosed in the pertinent cross-referenced applications for selectively generating a control signal. However, this combination may be replaced by a conventional switch associated with a conventional, mechanically keyable door lock, the switch being actuated by keying of the door lock to generate a control signal. The system further comprises voltage regulation circuit 30, surrogate signal generating circuit 40, unlocking signal generating circuit 50, disabling signal generating circuit 60, and starting/warning circuit 70. Both the vehicle engine electrical spark distributor 80 and ignition switch 90 are coupled to the surrogate signal generating circuit 40. Distributor 80 is shown in rudimentary form, since it does not form any part of the present invention. This distributor may, of course, take various forms, including both mechanical and electronic types of distributors. For the same reason, the ignition switch 90 is also shown in rudimentary form, with the moveable armature 90a thereof being rotatable to alignment with either the OFF, ON or START contacts. An arcuate wiper 90b is mechanically and electrically connected to the free end of armature 90a to establish electrical contact with both the ON and START contacts when the armature 90a is aligned with the START contact. The ignition switch 90 may also include ACCESSORY, LOCK, and other contacts in addition to those shown. The optional door-switch controlled locking circuit 100 receives its input signal from the associated, normally open door switch SW1, and provides a momentary output to at least one associated door-locking solenoid SOL2 upon closing and subsequent reopening of SW1. The optional warning circuit 110 is coupled to the output of the disabling signal generating circuit 60 to provide an indication to the vehicle operator that the warning or alarm device is disabled.

In operation, voltage regulation circuit 30 receives unregulated B+ (nominally 12 volts DC) across terminals T1 and T2, causing zener diode D1 to break down and allow current flow through limiting resistance R1 and D1. The substantially constant voltage developed at the cathode of D1 is fed through blocking diode D2 to smoothing capacitance C1. A regulated output voltage of approximately +11 volts DC is thus developed at the junction of the cathode D2 and C1, and is applied to the component circuits 40, 50 and 60. When keying circuit 10 is placed in a predetermined spatial relationship with keyable control circuit 20, the latter circuit generates a control signal which is transferred by the isolating emitter-follower amplifier comprising transistor Q10 to at least one door unlocking solenoid SOL1, which may have a plurality of other door unlocking solenoids connected in parallel therewith for simultaneous energization by the amplifier output. The control signal is also simultaneously fed to disabling signal generating circuit 60; specifically, it is applied to the voltage divider formed by series-connected resistances R16 and R17, the junction of which is coupled to the input terminals of inverters D and E. Thus, a reduced positive voltage pulse is applied to the input terminals of inverters D and E, causing negative-going pulses of equal duration to be produced at the output terminals of these inverters. In response to the negative-going pulse appearing at the output of inverter E, normally charged capacitance C6 discharges rapidly through diode D12 and inverter E, thus producing a negative-going pulse at the input of inverter F. Consequently, a positive-going pulse will appear at the output of inverter F to back-bias diode D13. As long as diode D13 is back biased, the normally closed shunt path through D13 and inverter F will be opened. However, since the output of inverter D goes low when the output of inverter F goes high, and since the output of inverter D will remain low as long as its input is high, the junction of resistances R21 and R22 will remain shunted until the positive signal is removed from the input of inverter D. Resistance R21 serves to limit the magnitude of current flow through diode D13 and inverter F, and through diode D11 and inverter D, whenever either of these shunt paths is closed.

When the control signal generated by keyable control circuit 20 is terminated upon withdrawal of keying circuit 10, the input of inverter D goes low, thereby causing the output of inverter D to go high. Thus, the shunt path through diode D11 and inverter D is opened. At this point in time, the output of the disabling signal generating circuit 60 goes from approximately ground potential to a high positive voltage. This disabling output is derived at the junction of the anodes of diodes D11 and D13 and resistance R21. Since the termination of the positive input to inverter E also occurred simultaneously with the termination of the positive input to inverter D, the output of inverter E goes positive simultaneously with the output of inverter D. Thus, the discharge path for capacitance C6 through diode D12 and inverter E is opened, and the timing function is initiated by the recharging of capacitance C6 by current flowing through timing resistances R18 and R19. When the voltage on capacitance C6 exceeds a predetermined value, the output of inverter F will again go low, thereby reclosing the normally closed shunt path through diode D13 and inverter F, thereby terminating the positive disabling signal fed to starting-/warning circuit 70. The duration of the disabling signal may be shortened by closing switch SW3, thereby shunting resistance R18 and enabling more rapid charging of capacitance C6 through resistance R19 alone.

The positive output pulse thus generated by disabling signal generating circuit 60 is applied through resistance R22 to the base of transistor Q7, thereby causing Q7 to become conductive. Thus, current flow through the voltage divider formed by resistance R24 and R25 and through Q7 is initiated, causing transistor Q8 to become conductive and shunt the winding of relay RE2 for the duration of the disabling signal from circuit 60, thereby preventing energization of relay RE2 during this predetermined period of time.

The voltage at the collector of Q7 is provided as an input to a feedback circuit formed by transistor Q6, resistance R20 and capacitance C7 in the disabling signal generating circuit 60. When the collector of Q7 goes from its normally high voltage to near ground potential upon initiation of the disabling signal output of circuit 60, the condition of normally non-conductive transistor Q6 is unchanged by the negative-going pulse applied through C7 to its base. However, when the disabling signal becomes less positive as a result of recharging of C6, Q7 becomes less conductive and its collector becomes increasingly positive. Thus, a positive pulse is applied through C7 to the base of Q6, rendering Q6 conductive and thereby shunting both R18 and R19 to allow rapid recharging of C6 during the final portion of the recharging period. A disabling signal pulse having a more sharply-defined trailing edge and a shorter fall time is thus produced.

If the armature of ignition switch 90 is moved from the OFF contact past the ON contact to the START contact within the duration of the disabling signal of circuit 60, the unregulated source voltage B+ will be applied across resistance R27 and through resistance R26 to the base of transistor Q9, which is consequently rendered conductive to close the current path through Q8, Q9 and the winding of starting relay RE1, thereby causing energization of the starter solenoid SOL3 without actuating the alarm or warning means such as the vehicle horn. If engine start-up is attempted without generation of the disabling signal by circuit 60, or after termination of the disabling signal, the winding of alarm relay RE2 will not be shunted. Thus, when transistor Q9 is rendered conductive by actuation of ignition switch 90 as described above, a reduced current will flow through the winding of RE2, transistor Q9 and the winding of RE1 due to the relatively high impedance of the winding of RE2 as compared to the impedance of transistor Q8 when conductive. The relays RE1 and RE2 are selected so that this reduced current flow is sufficient to actuate RE2, thereby actuating the alarm, but is not sufficient to actuate RE1, thereby preventing engine start-up.

During the starting of the vehicle engine, i.e., while the armature 90a of ignition switch 90 is in alignment with the START contact, transistor Q1 is rendered conductive by source voltage B+ applied through resistance R2 to the base of Q1, which shunts to ground the amplitude-limited pulses developed by the application of the pulse train generated by distributor 80 to the limiting circuit formed by inductance L1, capacitance C2 and zener diode D3 in the surrogate signal generating circuit 40. The purpose of this arrangement is to prevent generation of a surrogate signal during repeated attempts to start the vehicle engine after the vehicle has been entered. As will be explained further on, the surrogate signal generated by circuit 40 causes generation of a door unlocking signal by circuit 50, and this is not desirable during the aforementioned phase of vehicle operation. When the vehicle engine is running, i.e., when the armature 90a of ignition switch 90 is returned to alignment with the ON contact, Q1 is returned to its normally non-conductive state, and the amplitude-limited pulses developed across D3 will be transmitted via parallel paths formed by blocking diodes D4 and D5 to associated RC input circuits. The RC input circuit which is charged through diode D4 comprises capacitance C3 and resistances R3 and R4. The RC input circuit which is charged through diode D5 comprises capacitance C4 and resistances R9 and R10. The junction of resistances R3 and R4 is connected to the base of transistor Q2, and the junction of resistances R9 and R10 is connected to the base of transistor Q3. The normally non-conductive transistors Q2 and Q3 are part of a differential amplifier which also includes resistances R5, R6, R7 and R8. More specifically, the values of the RC input circuits are such that Q2 is rendered conductive before Q3 can become conductive, thereby developing a positive voltage across R6 which is applied to the emitter of Q3 to prevent Q3 from becoming conductive even after the base voltage of Q3 reaches a maximum value. The RC input circuit of Q3 is designed to have a time constant at least approximately three times greater than the time constant of the RC input circuit of Q2. Thus, when the engine stops running due to the ignition switch being turned off or due to stalling of the engine, the pulse trains fed through diodes D4 and D5 to the RC input networks of Q2 and Q3 cease, and capacitance C3 discharges through resistances R3 and R4 while capacitance C4 discharges through resistances R9 and R10. Because of the differences in time constants, C3 will discharge much more rapidly than C4. When the voltage at the base of Q2 (junction of resistors R3 and R4) falls below the voltage at the base of Q3 (junction of R9 and R10), Q3 becomes conductive. Therefore, current momentarily flows through series-connected resistances R7 and R8 and across the collector-emitter junction of Q3 through R6 to ground. The high positive voltage at the base of Q4 is consequently reduced to a level at which Q4 becomes conductive, enabling the flow of an output current pulse across its emitter-collector junction during the brief period of conductivity of Q3.

This output current pulse forms the surrogate signal generated by circuit 40; it is simultaneously fed as an input to the unlocking signal generating circuit 50 and through diode D6 to the disabling signal generating circuit 60. As previously explained, the circuit 60 initiates its timing function upon termination of an input pulse. Therefore, when the surrogate signal from circuit 40 terminates, circuit 60 initiates generation of disabling signal which is fed to starting/warning circuit 70. Thus, after an operator has intentionally turned off the vehicle engine, the operator has a predetermined period of time during which he can restart the engine without again employing keying circuit 10 to cause generation of a control signal by keyable control circuit 20 to disable the alarm, which in the disclosed embodiment is the vehicle horn. Simultaneously, circuit 50 generates a door unlocking signal which is provided to door unlocking solenoid SOL1 and to as many other unlocking door solenoids as may be connected in parallel therewith to receive this signal. It will be readily apparent that circuits 50 and 60 are essentially alike in structure and functioning, with certain exceptions. Circuit 50 does not include such refinements as the feedback circuit or the switch-cum-voltage divider found in circuit 60. Circuit 50 does include a blocking diode D6 to prevent its actuation by either its own output signal or by the control signal generated by keyable control circuit 20; it also includes a transistor Q5 and current-limiting resistance R15 to provide the door-unlocking signal in the form of a current pulse in response to a positive voltage at the base of Q5. Otherwise, the circuits 50 and 60 are alike, as the correspondence of their components indicates. The door unlocking signal which forms the output of circuit 50 is isolated from the input of circuit 60 by the emitter-follower amplifier comprising transistor Q10. Thus, the door unlocking signal is prevented from interrupting the generation of the disabling signal by circuit 60.

In the preferred embodiment of the present invention which has been described above and shown in the accompanying drawing, the values and/or characteristics of the various components are as follows:

| Resistances | Capacitances |
|---|---|
| R1 - 330 ohms | C1 - 16 microfarads |
| R2 - 10K ohms | C2 - .001 microfarads |
| R3 - 47K ohms | C3 - 0.2 microfarads |
| R4 - 150K ohms | C4 - 1.0 microfarads |
| R5 - 10K ohms | C5 - 0.1 microfarads |
| R6 - 10K ohms | C6 - 10 microfarads |
| R7 - 22K ohms | C7 - 0.1 microfarads |
| R8 - 10K ohms | |
| R9 - 100K ohms | Inductances |
| R10 - 33K ohms | |
| R11 - 10K ohms | L1 - 1 millihenry |
| R12 - 33K ohms | |
| R13 - 22K ohms | Diodes |
| R14 - 330K ohms | |
| R15 - 10 ohms | D1 - 1N5242 |
| R16 - 10K ohms | D2 - 1N4148 |
| R17 - 33K ohms | D3 - 1N5242 |
| R18 - 4.7K ohms | D4 ⎫ |
| R19 - 1K ohms | D5 ⎪ |
| R20 - 10K ohms | D6 ⎪ |
| R21 - 10K ohms | D7 ⎪ |
| R22 - 10K ohms | D8 ⎬ 1N4148 |
| R23 - 10K ohms | D9 ⎪ |
| R24 - 10K ohms | D10 ⎪ |
| R25 - 1.5K ohms | D11 ⎪ |
| R26 - 4.7K ohms | D12 ⎪ |
| R27 - 1K ohms | D13 ⎭ |
| Transistors | |
| | Inverters |
| Q1 - 2N5132 | |
| Q2 - 2N5132 | A ⎫ |
| Q3 - 2N5132 | B ⎪ |
| Q4 - 2N4248 | C ⎬ CD4009A |
| Q5 - 2N5132 | D ⎪ |
| Q6 - 2N5132 | E ⎪ |
| Q7 - 2N5132 | F ⎭ |
| Q8 - 2N3638 | |
| Q9 - 2N3567 | |
| Q10 - MJE521 | Relays |
| | RE1 - KPR11DG P.B. |
| | RE2 - 61-167 R.B.M. |

The advantages of the present invention, as well as certain changes and modifications of the disclosed embodiment thereof, will be readily apparent to those skilled in the art. For example, the circuit embodying the present invention may take a more rudimentary form by eliminating the door unlocking signal generating circuit 50 and feeding the surrogate signal fed by circuit 40 directly to disabling signal generating circuit 60 through the diode D6. Also, both the surrogate signal generating circuit 40 and the door unlocking signal generating circuit 50 may be eliminated, if the functions performed thereby are not deemed necessary or desirable in a particular application of the invention. The various circuits previously indicated as being optional, such as door-switch controlled locking circuit 100 and warning circuit 110, may be eliminated from the disclosed system. A variety of warning or alarm means other than the vehicle horn may be controlled by the circuit embodying the present invention. It is the applicant's intention to cover all changes and modifications which could be made to the embodiment of the invention herein chosen for the purposes of the disclosure without departing from the spirit and scope of the invention.

What is claimed is:

1. In a vehicle including door lock control means operative when keyed to generate a control signal, an engine, engine-driven electrical spark distributor means, a starting switch for said engine, and warning means, the improvement comprising:
   circuit means coupled to said door lock control means, to said distributor means, to said starting switch, and to said warning means, and normally operative in the absence of said control signal to actuate said warning means upon actuation of said starting switch, and operative in response to said control signal to disable said warning means for a predetermined period of time from the termination of said control signal and to enable engine start-up by actuation of said starting switch within said predetermined period of time, and further operative to receive a pulse train generated by said distributor means during periods of vehicle engine operation, and operative in response to cessation of said pulse train to disable said warning means for a predetermined period of time after cessation of said pulse train and to enable engine restarting by actuation of said starting switch within said predetermined period of time.

2. The improvement according to claim 1 wherein said circuit means further comprises means operative in response to cessation of said pulse train generated by said distributor means during periods of vehicle engine operation to unlock at least one of the vehicle doors.

3. The improvement according to claim 1 wherein said circuit means comprises:
   1. disabling signal generating means coupled to said door lock control means and operative to receive said control signal and, in response thereto, to generate a disabling signal for a predetermined period of time from the termination of said control signal;
   2. starting/warning means coupled to said disabling signal generating means, to said starting switch, and to said warning means, and normally operative in the absence of said disabling signal to prevent engine start-up and to actuate said warning means upon actuation of said starting switch, and operative to receive said disabling signal and, in response thereto, to enable engine start-up by actuation of said starting switch during said predetermined period of time, and simultaneously operative in response to said disabling signal to prevent actuation of said warning means during actuation of said starting switch within said predetermined period of time; and
   3. surrogate signal generating means coupled to said distributor means, to said starting switch, and to said disabling signal generating means, and operative to receive a pulse train generated by said distributor means during periods of vehicle engine operation, and operative in response to engine turn-off to generate a surrogate signal which is applied to said disabling signal generating means in lieu of said control signal.

4. The improvement according to claim 3 wherein said circuit means further comprises unlocking signal generating means coupled to said surrogate signal generating means and to said door lock control means, and operative to receive said surrogate signal and, upon termination thereof, to generate an unlocking signal which is applied to said door lock control means to cause unlocking of at least one vehicle door.

5. The improvement according to claim 3 wherein said disabling signal generating means comprises:
   1. voltage divider means coupled to said door lock control means;
   2. charging circuit means including a normally charged timing capacitance;
   3. semiconductor means coupled to said voltage divider means and to said charging circuit means, and operative to discharge said timing capacitance upon initiation of said control signal, and to generate said disabling signal following the termination of said control signal until said timing capacitance is recharged to a predetermined level; and
   4. feedback circuit means coupled between said starting/warning means and said charging circuit means to enhance the fall time of said disabling signal.

6. The improvement according to claim 5 wherein said charging circuit means comprises first and second resistances connected in series with said timing capacitance between the terminals of a power source, the junction of said second resistance and said timing capacitance being coupled to said semiconductor means, and a switch connected so as to enable selective shunting of said first resistance.

7. The improvement according to claim 6 wherein said feedback circuit means is connected across both said first and second resistances in said charging circuit means so as to enable momentary shunting of said first and second resistances in response to a decrease in the magnitude of the disabling signal applied to said starting/warning means.

8. The improvement according to claim 3 further comprising warning circuit means coupled to said disabling signal generating means and operative in response to said disabling signal to provide a warning signal for the duration of said disabling signal.

9. The improvement according to claim 3 wherein said starting/warning means comprises:
   1. a first relay comprising a winding, an armature, and a contact and operative when actuated to cause engine start-up;
   2. a second relay comprising a winding, an armature, and a contact and operative when actuated to cause actuation of said warning means;
   3. first transistor switching means having its output terminals connected in series with the windings of said first and second relays between the terminals of a power source, and having its input terminal coupled to said starting switch, and operative upon actuation of said starting switch to become conductive;

4. second transistor switching means having its output terminals connected across the winding of said second relay in order to shunt said winding when rendered conductive; and 5. third transistor switching means having an output terminal coupled to the input terminal of said second transistor switching means and having its input terminal coupled to said disabling signal generating means, and operative to receive said disabling signal and, in response thereto, to render said second transistor switching means conductive.

10. The improvement according to claim 9 wherein said first transistor switching means comprises:

1. a first transistor having its output terminals connected between and in series with the windings of said first and second relays; and 2. first and second resistances connected in series from the input terminal of said first transistor to the low side of the winding of said first relay, the junction of said first and second resistances being connected to said starting switch.

11. The improvement according to claim 9 wherein said third transistor switching means comprises:

1. third and fourth resistances connected in series, the junction of said third and fourth resistances being connected to the input terminal of said second transistor switching means;

2. a third transistor having its output terminals connected in series with said third and fourth resistances; and 3. an input network connected between the input terminal of said third transistor and said disabling signal generating means to receive said disabling signal, in response to which said third transistor is rendered conductive.

12. The improvement according to claim 3 wherein said surrogate signal generating means comprises:

1. limiting circuit means having its input coupled to said distributor means and operative to reduce the amplitude of the pulses in the pulse train generated by said distributor means during periods of vehicle engine operation;

2. first and second RC circuits having their inputs coupled to the output of said limiting circuit means and having time constants differing by a factor of at least 3, and operative to receive the reduced-amplitude pulses developed by said limiting circuit means;

3. differential amplifier means including first and second transistors having their input terminals coupled to said first and second RC circuits, respectively, said first transistor being rendered conductive during charging of said first and second RC circuits so as to alter the bias on said second transistor to prevent said second transistor from becoming conductive during charging of said first and second RC circuits; and 4. a third transistor having its input coupled to said differential amplifier means and operative, when rendered conductive by said differential amplifier means, to generate said surrogate signal.

13. The improvement according to claim 12 wherein said surrogate signal generating means further comprises a fourth transistor having its input terminal coupled to said starting switch and its output terminals connected to shunt the output pulses from said limiting circuit means when said fourth transistor is rendered conductive by actuation of said starting switch.

14. The improvement according to claim 12 wherein the input terminal of said third transistor is coupled to an output terminal of said second transistor.

15. The improvement according to claim 4 wherein said unlocking signal generating means comprises:

1. voltage divider means coupled to said surrogate signal generating means;

2. charging circuit means including a normally charged timing capacitance; and 3. semiconductor means coupled to said voltage divider means and to said charging circuit means, and operative to discharge said timing capacitance upon initiation of said surrogate signal, and to generate said unlocking signal following the termination of said surrogate signal until said timing capacitance is recharged to a predetermined level.

* * * * *

UNITED STATES PATENT OFFICE
CERTIFICATE OF CORRECTION

PATENT NO. : 3,866,168
DATED : February 11, 1975
INVENTOR(S) : Francis A. McGuirk Jr.

It is certified that error appears in the above-identified patent and that said Letters Patent are hereby corrected as shown below:

Assignee should read: WAGNER ELECTRIC CORPORATION

Col. 3, Line 12: "of" omitted between "cathode" and "D2"

Col. 6, under "Diodes": "D14" omitted within the bracket

Signed and sealed this 15th day of July 1975.

(SEAL)
Attest:

RUTH C. MASON
Attesting Officer

C. MARSHALL DANN
Commissioner of Patents
and Trademarks